(12) United States Patent
Williams et al.

(10) Patent No.: US 10,523,268 B2
(45) Date of Patent: Dec. 31, 2019

(54) SIGNAL POWER REDUCTION SYSTEMS AND METHODS

(71) Applicant: CABLE TELEVISION LABORATORIES, INC, Louisville, CO (US)

(72) Inventors: Thomas H. Williams, Longmont, CO (US); Gregory Charles White, Louisville, CO (US)

(73) Assignee: Cable Television Laboratories, Inc, Louisville, CO (US)

( * ) Notice: Subject to any disclaimer, the term of this patent is extended or adjusted under 35 U.S.C. 154(b) by 0 days.

(21) Appl. No.: 16/031,873

(22) Filed: Jul. 10, 2018

(65) Prior Publication Data

US 2018/0323823 A1  Nov. 8, 2018

Related U.S. Application Data

(63) Continuation of application No. 15/345,326, filed on Nov. 7, 2016, now Pat. No. 10,044,405.

(60) Provisional application No. 62/252,107, filed on Nov. 6, 2015.

(51) Int. Cl.

| | |
|---|---|
| H04L 5/12 | (2006.01) |
| H04B 3/04 | (2006.01) |
| H04L 27/00 | (2006.01) |
| H04L 27/04 | (2006.01) |
| H04L 27/20 | (2006.01) |
| H04L 27/34 | (2006.01) |

(52) U.S. Cl.
CPC ........... *H04B 3/04* (2013.01); *H04L 27/0008* (2013.01); *H04L 27/04* (2013.01); *H04L 27/20* (2013.01); *H04L 27/3411* (2013.01)

(58) Field of Classification Search
CPC ....... H04B 3/04; H04L 27/0008; H04L 27/04; H04L 27/20; H04L 27/3411
USPC .......................................................... 375/261
See application file for complete search history.

(56) References Cited

U.S. PATENT DOCUMENTS

| | | | |
|---|---|---|---|
| 5,502,744 A | 3/1996 | Marshall | |
| 6,301,313 B1 | 10/2001 | Gevargiz et al. | |
| 6,404,931 B1 * | 6/2002 | Chen | H03M 7/42 341/67 |
| 6,553,535 B1 * | 4/2003 | Asada | H03M 13/11 375/269 |
| 2002/0126359 A1 | 9/2002 | Gnauck et al. | |
| 2003/0112888 A1 * | 6/2003 | Takano | H04L 27/3411 375/286 |
| 2004/0146269 A1 | 7/2004 | Levy-Yurista et al. | |
| 2007/0222654 A1 | 9/2007 | Vrazel et al. | |
| 2010/0079329 A1 | 4/2010 | Stayton | |
| 2015/0146816 A1 | 3/2015 | Hollis | |

\* cited by examiner

*Primary Examiner* — Helene E Tayong
(74) *Attorney, Agent, or Firm* — Armstrong Teasdale LLP

(57) ABSTRACT

A method of reducing transmission power for an encoded data stream includes the steps of receiving an incoming data stream having equal probability for a plurality of incoming data bits, assigning a symbol scheme to the received data bits of the incoming data stream according to probabilities of occurrence of individual ones of the received data bits, and transmitting an outgoing data stream according to the assigned symbol scheme having a second average transmit power, different than the first average transmit power, for a plurality of outgoing symbols.

20 Claims, 6 Drawing Sheets

SIGNAL POWER REDUCTION SYSTEMS AND METHODS

CROSS REFERENCE TO RELATED APPLICATIONS

This application is a continuation of U.S. patent application Ser. No. 15/345,326, filed Nov. 7, 2016, which prior application claims the benefit and priority to U.S. Provisional Patent Application Ser. No. 62/252,107, filed Nov. 6, 2015, the disclosure of which is herein incorporated by reference in its entirety.

BACKGROUND

The field of the disclosure relates generally to data transmission systems, and more particularly, to data transmission systems utilizing input data and outputs symbol streams.

Conventional data transmission systems typically determine data capacity for communication lines according to available transmit power. With deployment of improved cable taps and improved amplifiers, communications services now contemplate utilizing bandwidths over 1 gigahertz (GHz). For high-speed internet services, bandwidth requirements for delivering high-speed data and video services over access networks are rapidly increasing to meet growing residential and business consumer demands. However, in some conventional data transmission systems, elevated data signal attenuation, combined signal noise, and limited transmit power function together to reduce data throughput for both upstream and downstream signals.

It is therefore difficult, in conventional data transmission systems for communications services, to determine the maximum data capacity available over a communication line where, for example, a user's transmit power is limited, but excess bandwidth is available.

BRIEF SUMMARY

A method of reducing transmission power for an encoded data stream includes the steps of receiving an incoming data stream having a first average transmit power for a plurality of incoming data bits, assigning a symbol scheme to the received data bits of the incoming data stream according to probabilities of occurrence of individual ones of the received data bits, and transmitting an outgoing data stream according to the assigned symbol scheme having a second average transmit power, different than the first average transmit power, for a plurality of outgoing symbols.

In another aspect, a symbol transmission system for an encoded data stream includes a memory and a processor. The processor is communicatively coupled with the memory, and is programmed to execute instructions to receive an incoming data stream, determine a probability of a binary bit stream represented by the incoming data stream, assign a symbol scheme to the binary bit stream based on the determined probability, and transmit an outgoing data stream according to the assigned symbol scheme.

In a further aspect, a method of reducing transmission power for a data stream having a plurality of equally probable states includes the steps of determining the average power required to transmit an individual one of the plurality of equally probable states, calculating the time required to transmit each one of the plurality of equally probable states, and reducing the transmission time for at least one state of the plurality of equally probable states.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
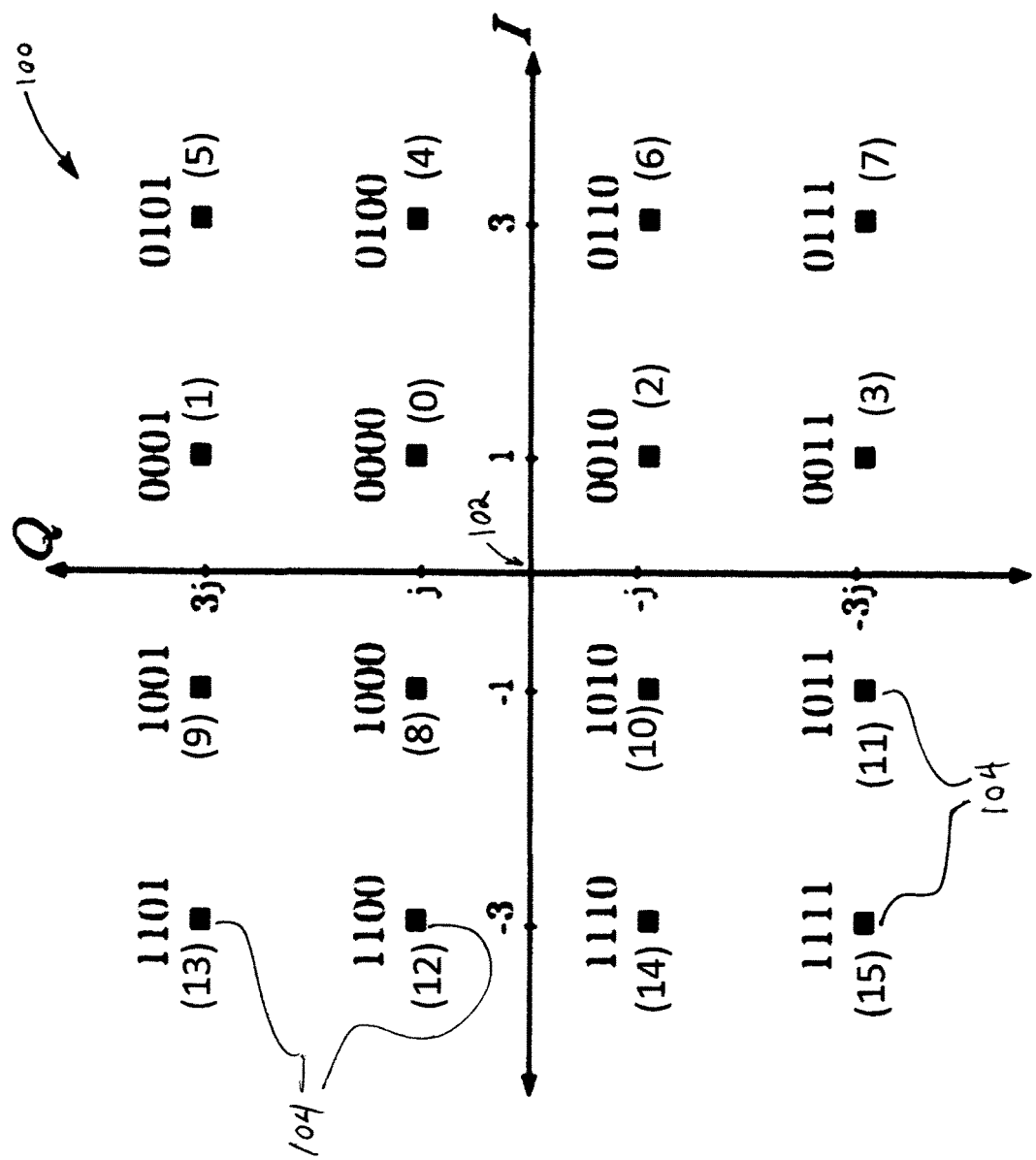
FIG. 1 is a graphical illustration of an exemplary quadrature amplitude modulation (QAM) scheme for assigning symbols to a binary data stream.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

FIG. 1 is a graphical illustration of an exemplary constellation diagram 100 for a quadrature amplitude modulation scheme (QAM) for encoding binary digital data. In the example shown, for ease of illustration, constellation diagram 100 is a 16-state QAM, or 16-QAM, system. In alternative embodiments, the principles disclosed herein are scalable and may be applied to other modulation systems of 64-QAM, 256-QAM, 1024-QAM, 4096-QAM, or even 32768-QAM or greater, OFDM (orthogonal frequency division-multiplexing) or VSB (vestigial sideband).

In the exemplary embodiment shown, constellation diagram 100 plots half byte length groups, i.e., four bits, of ones (1's) and zeros (0's) arranged in four quadrants of a Q (quadrature) vs. I (in-phase) axis of the constellation, and into 16 states 104 about a constellation origin 102. Each state of the 16 states 104 occupies a Q-I point on constellation diagram 100 where a radial distance of the Q-I point from constellation origin 102 corresponds to amplitude, and an angle of the Q-I point relative to the positive I-axis corresponds to phase, respectively, of a signal waveform transmitting the information of the particular state 104. The greater the radial distance is from constellation origin 102 to a Q-I point on constellation diagram 100, the greater the amplitude, and thus electrical power, required to transmit a symbol corresponding to the particular state 104. In particular, power is proportional to distance (voltage) squared. In the 16-QAM example illustrated, four respective amplitude magnitudes (not separately numbered) are utilized for transmitting hexadecimal symbols "0" to "15" range from 1+j to 3+3j, with intermediate values of 1+3j and 3+j.

Accordingly, in constellation diagram 100, an arbitrary symbol can be assigned to each state 104 of the sixteen. For example, symbols "0" to "15" (denoted in parentheses in FIG. 1) are assigned to each state 104 of the sixteen, respectively, and each state 104 therefore has an approximately equal probability of occurring in a binary digital data stream of arbitrary length.

Table 1, below, depicts the sixteen possible states 104.

TABLE 1

| Symbol | State | |
|---|---|---|
| 0 | 0000 | <<Start of sampling frame |
| 1 | 0001 | |
| 2 | 0010 | |
| 3 | 0011 | |
| 4 | 0100 | |
| 5 | 0101 | |
| 6 | 0110 | |
| 7 | 0111 | |
| 8 | 1000 | |
| 9 | 1001 | X (transmitter transmits only at this time slot) |
| 10 | 1010 | |
| 11 | 1011 | |
| 12 | 1100 | |
| 13 | 1101 | |
| 14 | 1110 | |
| 15 | 1111 | <<End of sampling frame |

As shown in Table 1, 16 4-bit states (e.g., states 104, FIG. 1), are possible from 16-QAM constellation diagram 100. In conventional systems, transmission of a data stream under this scheme requires a transmitter (not shown) and a receiver (not shown) to essentially play "a guessing game" as to which row in Table 1 is to be selected for transmission. Using a synchronized frame with 16 equally spaced time slots, when the transmitter reaches the 4-bit state 104 desired to be sent, it transmits a signal using, for example, 1 W of transmit power. At all other times, the transmitter transmits 0 W. In the example of Table 1, therefore, the "X" indicated in the rightmost column represents the transmission timeslot. Accordingly, the average power to transmit any particular state 104 for 4 bits of information is 1/16 of a Watt, or 0.0625 W. That is, each state 104 has a 1/16 probability of occurring, on average. When comparing this 1/16 average probability with the basic ½ probability of a binary data bit being transmitted (see FIG. 2, below), a significant time penalty is experienced by conventional systems as constellation diagrams increase in scale.

Figure 2:
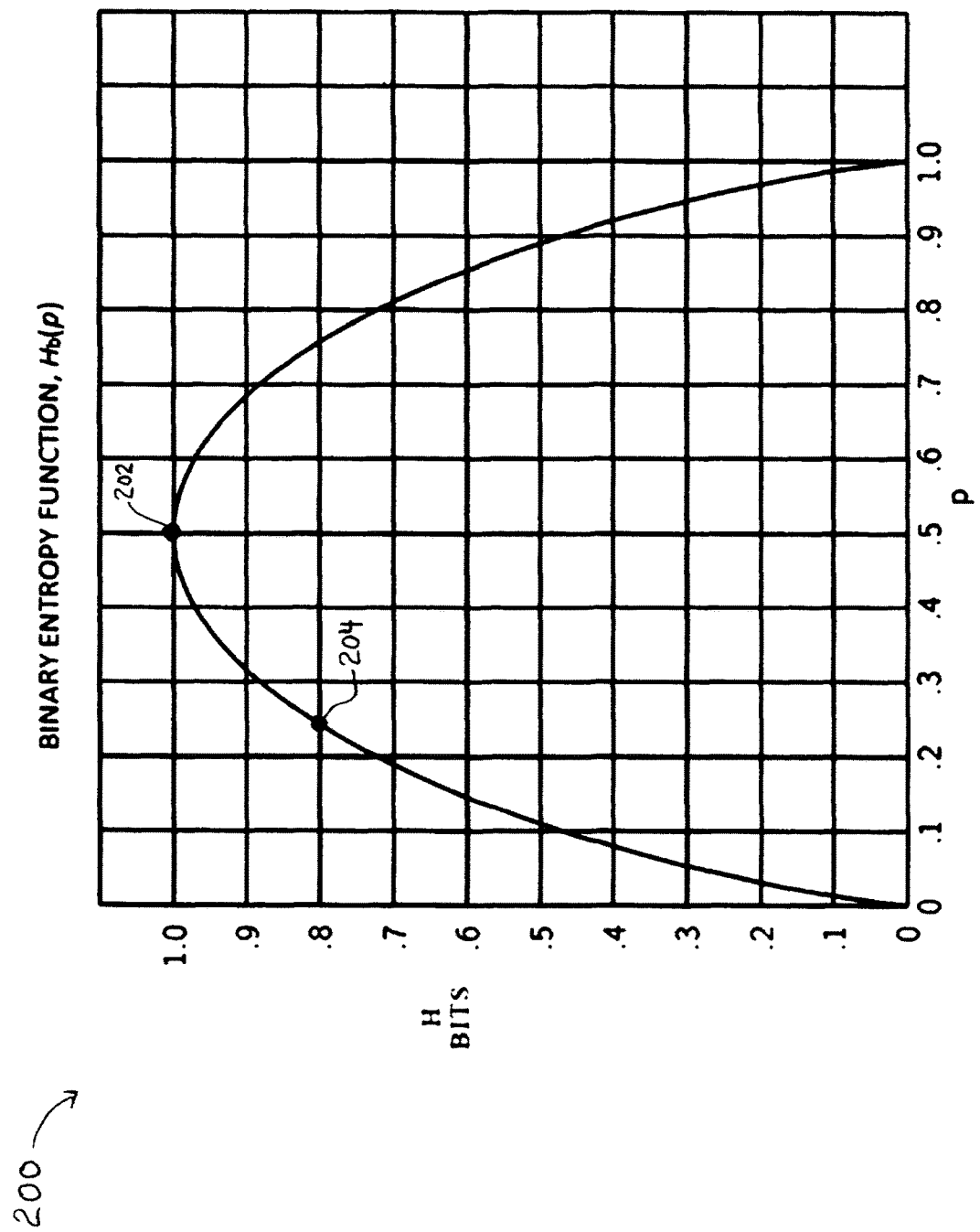
FIG. 2 is a graphical illustration of a probability curve for transmitted data stream, according to an embodiment.

FIG. 2 is a graphical illustration of a probability curve 200 of a binary entropy function, $H_b(p)$, representing respective probabilities of "1" and "0" occurring from a transmitted binary data stream (see FIGS. 4, 5, below). Probability curve 200 depicts $H_b(p)$ as the entropy H (y-axis) for an effective number of bits per symbol transmitted versus a probability p (x-axis) of a "1" state occurring in a stream of binary digital data of arbitrary length. In a 2-state binary amplitude-shift keying (BASK) encoding scheme, where a "0" state symbol corresponds to a zero signal waveform amplitude, or "off," requiring substantially 0 transmit power (i.e., other than a basal threshold power value necessary to maintain system operation), and where a "1" state symbol corresponds to a non-zero valued signal waveform amplitude, or "on," and a non-zero required transmit power, each available state (e.g., state 104, FIG. 1) will experience an equal probability of occurring, on average, over time.

In the BASK encoding scheme example, which can be implemented using a laser to transmit data over a fiber optic line (not shown), the exemplary values described with respect to Table 1, above, are again presumed for purposes of explanation. That is, transmission of the "1" state will transmit 1 W of power over a laser (not shown) for a given period of time, whereas transmission of the "0" state symbol requires 0 W of power, or that the laser is "off" (i.e. biased down to threshold current) for the given period. In such cases where the data to be encoded and transmitted has approximately equal occurrence probabilities of 1 and 0 (i.e., p=0.5), the transmitter (e.g., laser-based fiber optic) operates at a point 202 on probability curve 200, and the average transmit power will be 0.5 W. The time penalty discussed above with respect to table 1 thus becomes apparent when comparing this 0.5 probability with the 0.0625 (1/16) probability of the 16-QAM example.

Referring back to probability curve 200, where point 202 represents a typical probability of a "1" state symbol (i.e., "laser on") being p=0.5, point 204 represents the same transmission, but at p=0.25, that is, a ¼ probability. In this example, H (y-axis) for point 204 is reduced from 1.0 to 0.8, or 20 percent, while the probability p (x-axis) is reduced from 0.5 to 0.25, or 50 percent, for point 204 relative to point 202. The practical effect of reducing p from 0.5 to 0.25 is to decrease the average transmit power by half (from 0.5 W to 0.25 W), which is equivalent to a reduction of 3 decibels (dB) in this example where 1 W equals the power to transmit a "1." According to this exemplary embodiment though, H is disproportionately decreased by only 20 percent in light of the parabolic shape of probability curve 200. In other words, greater savings in power reduction can be achieved than the amount of information (bits) lost by shifting the probability leftward along probability curve 200.

Utilizing these principles for a 16-QAM scheme (e.g., constellation diagram 100, FIG. 1), each unique half byte string of four bits is encoded as one symbol of the sixteen available signal states (e.g., states 104). Thus, given one synchronized sampling frame of a digital signal processor (DSP) and/or analog-to-digital converter (ADC), each half byte string of binary digital data to be transmitted has an approximately equal probability (i.e., p=1/16) of occurrence in the respective sampling time. Thus, the inner four states have a probability of 0.25, the outer four states also have a probability of 0.25, and the middle states have a probability of 0.5. As the amount of information per constellation is scaled upward, significant power savings can be achieved (see FIG. 3, below), but without proportional loss in transmitted information.

The Shannon Entropy, H, is the number of bits per symbol. It is given by:

$$H = -\Sigma_i p_i \log_2(p_i) \quad (1)$$

So for the 16 equally probable states in FIG. 1, H=16*(0.0625)*4=4 bits per symbol.

In conventional systems that have no practical constraints on available power for symbol transmission, these probabilities for symbol occurrence and transmission power are of little consequence. However, as described above, increasing demand has made available transmission power more constrained, and thus advanced quadrature encoding schemes are unable to optimize power usage because the aforementioned probability distribution remains static over time. Accordingly, systems and methods according to the present embodiments are capable of realizing advantageous savings and transmission power without experiencing significant proportional loss of signal information.

Figure 3:
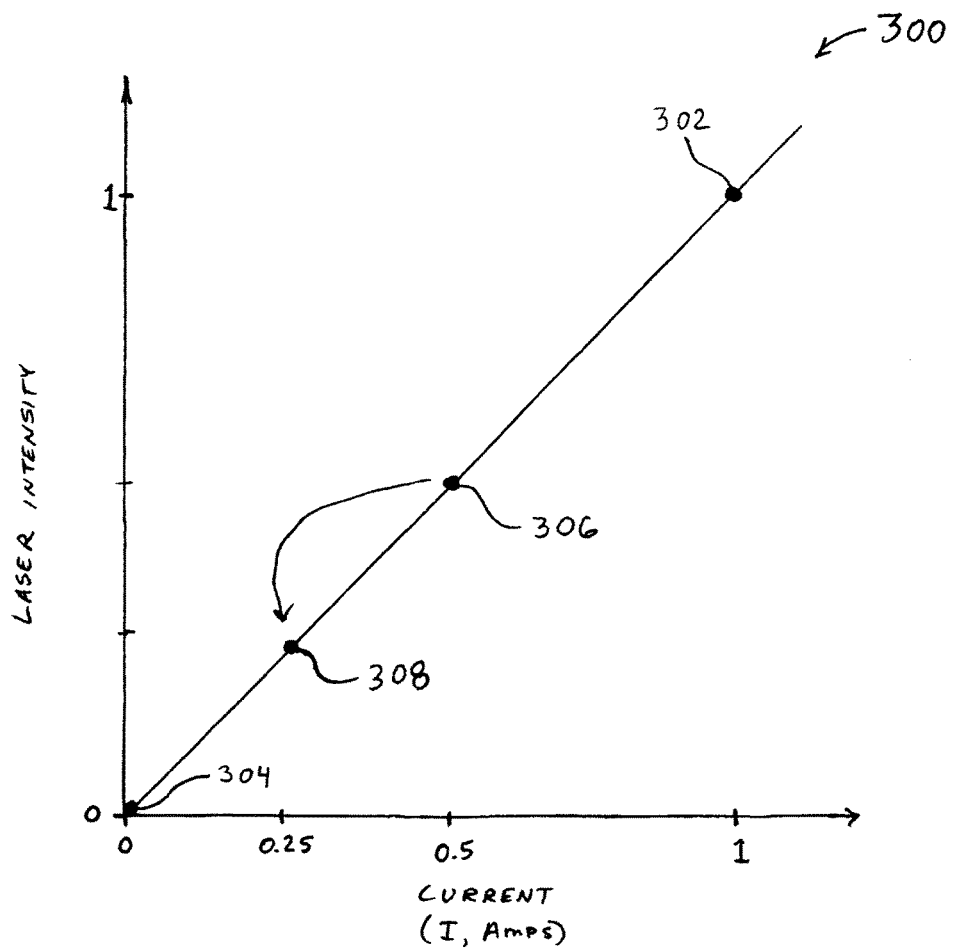
FIG. 3 is a graphical illustration of a probability distribution of a laser-based fiber optic data transmitter according to the embodiment depicted in FIG. 2.

FIG. 3 illustrates a graphical plot 300 representing operation of a laser-based fiber optic data transmitter utilizing the principles described above. More particularly, plot 300 represents the effect of reducing the probability of a "1" state symbol from p=0.5 to p=0.25, as shown and described above with reference to FIG. 2. Plot 300 depicts an intensity (y-axis) of a communication laser as a function of electrical current consumed (Amps, x-axis) by the laser, assuming the voltage drop of a laser diode is relatively constant. For simplification of explanation, intensity is illustrated in FIG. 3 as having a range of values between 0 and 1, where "1" corresponds to the laser (not shown) being on and having a luminous intensity value above a predetermined threshold for a predetermined amount of time at a predetermined wavelength for purposes of transmitting the "1" value. Similarly, laser intensity represented by the "0" value on the y-axis of plot 300 corresponds to the laser having a luminous intensity value below the predetermined threshold for a predetermined amount of time. For simplicity of this discussion, the threshold is shown at the zero value. In practical operation, lasers have a threshold current, below which they stop lasing.

In the exemplary embodiment of FIG. 3, current consumed by the laser is considered to be substantially proportional to laser intensity. A person of ordinary skill in the art would recognize and appreciate that laser intensity and its proportionality to current consumption finds analogues in wireless and wired data transmission systems where, for example, and without limitation, an amplitude of a waveform is proportional to electrical current and/or power used to transmit the waveform through a medium.

A conventional data transmission system therefore generally realizes, on average over time, an equal probability (p=0.5) that the laser of the system is transmitting power above the threshold intensity to communicate a "1" using a predetermined wavelength (e.g., 1550 nm for optical fiber), that is, the laser is operating at full power for approximately half the time during operation. Using the exemplary assumptions described above, transmission of a "1" requires, for example, 1 W of transmit power and the laser uses 1 volt (V), and an electrical current (I) of 1 Amp is consumed while the laser transmits "1," and this operational condition is represented by point 302 on plot 300. Under the same exemplary assumptions, transmission of "0" requires transmit power of approximately $I - _{threshold}$ Amps, and this operational condition is represented by point 304 on plot 300. Accordingly, point 306 represents the average probability (p=0.5) laser transmission occurring between points 302 and 304. Point 306 thus represents a conventional laser operating at an average current of 0.5 Amps (using the 1 W example) consumed over the period the laser is transmitting a binary data stream. In other words, in the case of operating a binary communication laser, normal practice with p=0.5 is to bias the laser with the maximum average power and spend half the time just above threshold level (e.g., substantially near 0 Amps) and half the time at twice the bias point (e.g., approximately 1 Amp).

In an exemplary embodiment, the symbol probability of transmitting at higher power, represented by point 302 in FIG. 3, is reduced from p=0.5 to p=0.25. This probability reduction, that is, the amount of time the laser is transmitting at an intensity below the equal probability point 306, the similarly reduces the average consumed current to point 308, which is a significant consideration with data transmission systems using, for example, laser fiber optics, since the reduction in average current will similarly decrease the average transmit power over time.

This principle is further emphasized with reference again to FIG. 2. As illustrated in FIG. 2, moving along probability curve 200 from point 202 (p=0.5) to point 204 (p=0.25) presents a greater savings in transmitted power (50 percent) than the amount of reduction in information bits and entropy H (from 1.0 to 0.8). The present embodiments are therefore significantly advantageous when utilized in a communication system with available bandwidth. For example, where an application can accept, on average, fewer bits per transmitted symbol, the laser will less frequently transmit at the higher power level represented by point 302 in FIG. 3, where both the average current and light output by the laser are reduced.

The principles of the embodiments described herein are further useful for transmission in drop cables, in addition to fiber optic lines. In both transmission vehicles, for example, there is often excess bandwidth available for transmission, but limited electromagnetic energy. In other words, transmission concerns are not governed so much by how much data needs to be transmitted, but instead by how many bits are to be conveyed (without error) per joule of energy. Simply put, transmitting more 0s (low power symbols) than 1s (higher power symbols) is a more efficient use of limited electromagnetic energy.

This principle becomes even more apparent for higher-order quadrature constellation signals. High-order QAM signals, for example, can populate center states (i.e., closer to the constellation origin) with a higher probability than outside constellation points (i.e., further from origin 102), reducing transmit current and power (RF) at the expense of transmission capacity. Moreover, a variety of additional practical benefits flow from reducing p for transmission of binary data streams. For example, in a wireless transmission system, where battery life is limited but there may be excess bandwidth available (e.g., a rural area with Wi-Fi), additional bandwidth can be used to transmit excess data (i.e., due to an increase in H) while simultaneously conserving battery power.

The systems and methods described herein for reducing p for some of the symbols can be contrasted with conventional methods of reducing continuous transmit power and reducing modulation order, e.g., from 16-QAM with 4 bits per symbol to QPSK with 2 bits per symbol. That is, because the probability of all states must add up to 1, p is reduced for some symbols, and correspondingly increased for others. Transmission power is then reduced by assigning the lowest power transmission requirements to the symbols having the highest probability of occurrence, as explained further below. In a wide variety of communication systems, further benefits of reducing p for some of the symbols as described herein are lower power operation for transmission, computing, memory, and encoding subsystems in a more efficient manner, thereby lowering operation temperature, and reducing operating and maintenance costs. The aforementioned benefits, and additional advantages that would be recognized and appreciated by persons having ordinary skill in the art, offset disadvantages of reduced data transmission rates due to reducing p for some of the symbols using the systems and methods described herein.

Figure 4:
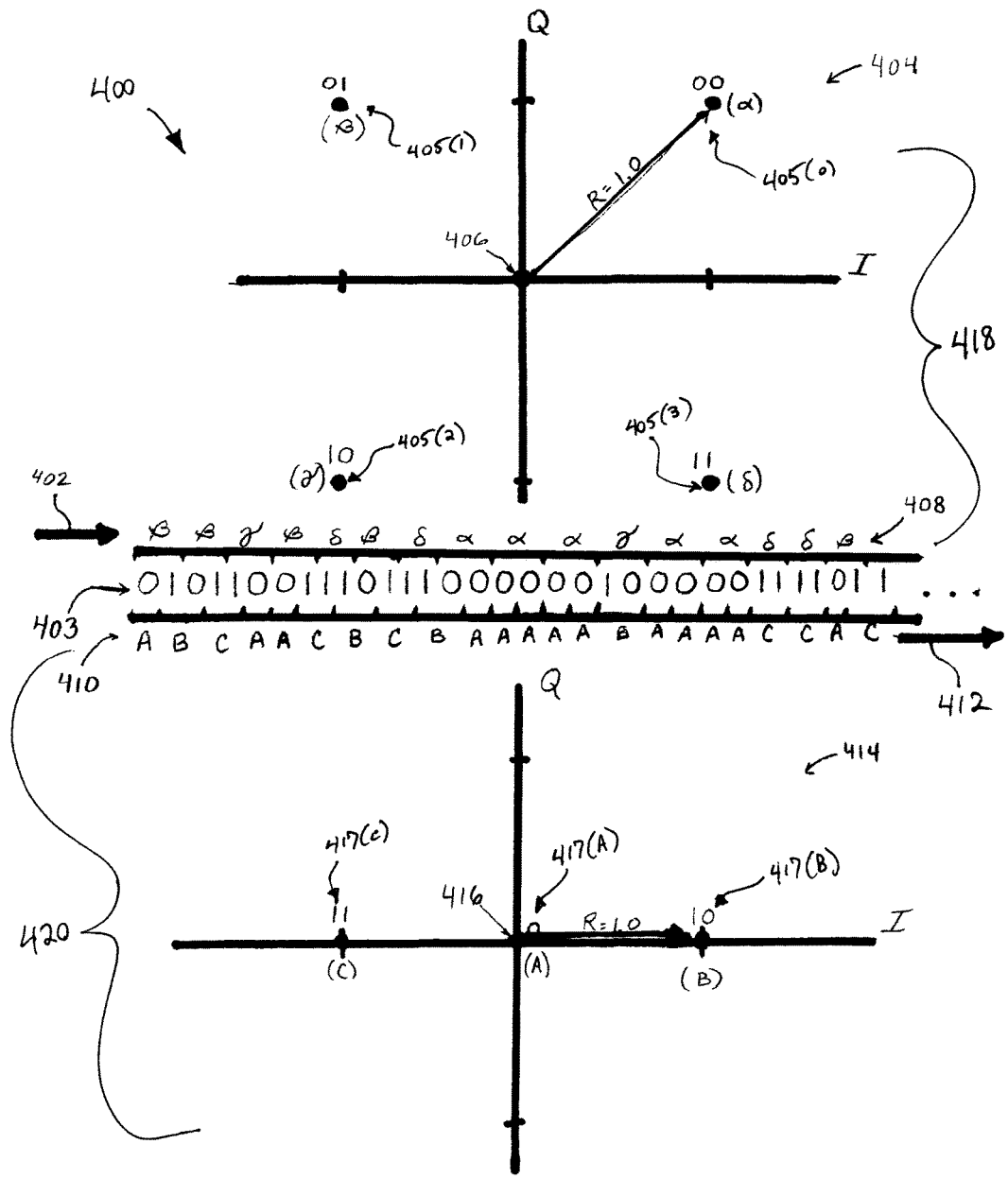
FIG. 4 is a schematic illustration depicting an exemplary symbol transmission process, according to an embodiment.

FIG. 4 is a schematic illustration depicting an exemplary symbol transmission process 400. In an exemplary embodiment of process 400, an incoming data stream is embodied by a binary string 403 and can be encoded into four-symbol incoming symbol stream 402 using a QPSK encoding scheme 418. In QPSK encoding scheme 418, two bit groups of 1s and 0s are arranged in a 4-state QPSK constellation diagram 404 about an origin 406. In this example, each state 405 of the 4-state QPSK occupies a Q-I point on constellation diagram 404, and each state has an equal radial distance (e.g., R=1.0) from origin 406. For this example, there are 4 possible states 405, labeled with symbols alpha ($\alpha$), beta ($\beta$), gamma ($\gamma$), and delta ($\delta$), respectively. Each state 405 represents 2 bits, with each state having an approximately equal occurrence probability of 0.25. That is, each state 405 will realize an approximately equal transmit current and transmit power, on average over time.

In the example illustrated, for a randomly selected incoming binary string 403 of 1s and 0s, having p=0.5 for each binary bit therein, is thus encoded by 4-state QPSK into a plurality of QPSK symbols 408 ($\alpha$, $\beta$, $\gamma$, and $\delta$) with four possible states 405 (denoted in FIG. 4 as 00, 01, 10, and 11, respectively), resulting in a total of sixteen QPSK symbols. Assuming that one joule (J) of energy is used to transmit each symbol 408, each individual bit transmitted therein uses 0.5 J. This QPSK transmission scheme therefore realizes an energy efficiency of 0.5 J per bit.

In an exemplary embodiment, process 400 monitors incoming binary string 403 and assigns a plurality of symbols 410 of a probability encoding scheme 420 as an outgoing data symbol stream 412. In an alternative embodiment, process 400 monitors incoming symbol stream 402 and converts incoming symbol stream 402 from the sixteen QPSK symbols 408 from the equal probability encoding scheme 418 into the plurality of converted symbols 410 of a different, unequal probability encoding scheme 420. In the exemplary embodiment, higher probability encoding scheme 418 is illustrated merely as reference to emphasize the advantageous results achieved by encoding scheme 420 on an incoming binary data string. The data stream of binary string 403, for example, may simply represent received data that is intended for transmission. In the alternative embodiment, process 400 instead may instead actively monitor an incoming symbol stream (i.e., symbol stream 402) that requires a higher power transmission, and convert the higher transmission power incoming symbols (i.e., symbols 408) into lower transmission power symbols (i.e., symbols 410) for the outgoing transmission.

In an exemplary embodiment, the plurality of assigned or converted symbols 410 includes three, rather than four, distinct symbols (denoted A, B, and C in FIG. 4). That is, instead of the 4-state QPSK-encoded data symbol stream 402 that would represent an equal probability assignment of symbols for binary string 403, to outgoing data symbol stream 412 has three states. Outgoing symbol stream 412 thus represents an encoding scheme (i.e., scheme 420) having a lower p value and, thus also a lower H value (see FIG. 2), as compared with symbols 408 of the 4-state and 4-symbol encoding scheme 418 required for symbol stream 402.

Outgoing symbol stream 412 of encoding scheme 420 is further depicted in a one-dimensional, or linear, 3-state constellation diagram 414. Constellation diagram 414 includes an origin 416 and three states 417. States 417(B)

(10, symbol B) and 417(C) (11, symbol C) are equidistant (i.e., R=1.0) from state 417(A) (0, symbol A) at origin 406. In the comparison to, or conversion from, incoming symbol stream 402, when a 0 is encountered by process 400, state 417(A), which is at origin 416 and requires no energy, is transmitted in outgoing symbol stream 412. Similarly, when the next two encountered bits are 10 (state 417(B)), a B symbol is transmitted, at 1 J, as a portion of outgoing symbol stream 412. When though, the next two encounter bits are 11 (state 417(C)), a C symbol is transmitted, also at 1 J, as a portion of outgoing symbol stream 412. It is significant to note though, that the probability of a symbol A is 0.5, whereas the respective probabilities of symbols B and C are both 0.25. Thus the Shannon entropy, H, can be calculated as 1.5 bits per symbol, (0.25*2)+(0.25*2)+(1*0.5).

In an exemplary embodiment, for incoming symbol stream 402, a monitoring system (e.g., system 600, FIG. 6, below) can be programmed such that bit pairs 10 and 11 take precedence over a single-bit occurrence of 0 for conversion by process 400 because the 2-bit pairs (represented by symbols B and C, respectively) have lower probabilities of occurrence within incoming symbol stream 402, and require greater energy and higher transmit power and current, relative to the single-bit occurrence of 0 (represented by symbol A).

As described above, in an exemplary embodiment, symbol stream 402 is encoded with the equal symbol probability 4-state/4-symbol QPSK scheme 418 with 2 bits per symbol. Symbol stream 402 can thus be represented as a two-dimensional (i.e., I and Q axes) on constellation diagram 404, as compared with outgoing symbol stream 412, which can be represented as a one-dimensional (i.e., I axis only) constellation diagram 414 representing the 3-state/3-symbol encoding scheme 418. A person of ordinary skill in the art will understand, after reading and comprehending the present disclosure, that process 400 is not limited to only a conversion from (or comparison with) 4-state scheme 418 into 3-state scheme 420 with 1.5 bits per symbol, which is disclosed for ease of explanation. Rather, process 400 may be implemented, by consideration of the respective probabilities and transmission powers, to convert (or in consideration of) an incoming higher power symbol stream into a lower power symbol stream.

Additionally, in an exemplary embodiment, an average energy per bit of 0.25 J can be realized (utilizing the same assumed values above) for transmitting the 3-state scheme 420 of outgoing symbol stream 412, as compared with an average energy per bit of 0.5 J that is required for the 4-state scheme 418 of incoming symbol stream 402. In other words, utilization of process 400 reduces by half the electromagnetic energy of outgoing symbol stream 412 as compared with the electromagnetic energy that would be required to transmit the same binary string 403 as symbol stream 402.

Conventional systems have not approached such a solution due to the fact that it takes longer to send the same message using the lower power symbol scheme than it does with the higher power symbol stream. That is, in the example illustrated in FIG. 4, approximately 23 symbols are used by the 3-state encoding scheme 420, whereas 16 symbols are used in the 4-state encoding scheme 418. The present inventors have discovered though, that many fiber optic systems are limited on transmission power, but retain unutilized excess bandwidth, thereby rendering process 400 particularly advantageous in such instances. In other words, the longer duration to transmit the outgoing symbol stream can be equated with using more bandwidth. This bandwidth-time product is a significant consideration made available in systems and methods according the present embodiments.

Process 400 this transmits, instead of the equal probability symbol stream 402, outgoing symbol stream 412 having a mix of symbols 410 of higher power (B and C), but occurring with lower probability, and symbols 410 of lower power (A), but occurring with a higher probability. By structuring the transmitted outgoing symbol stream such that the higher power symbols occur with lower probability, the resulting outgoing symbol stream 412 can be transmitted at a significantly lower power than would be required for an equal probability symbol stream, while only sacrificing a less significant percentage reduction of bits per symbol and data transmission rate. Process 400 thus utilizes the advantageous properties of outgoing symbol stream 412 by assigning less probable bit sequences (e.g., pairs 11 and 10) to symbols (B and C) requiring a higher transmission power, while assigning the more probable bit sequences (e.g., 0 occurrences) to symbols (A) requiring lower transmission power. The present embodiments are able to monitor an input data stream and assign symbols to the highest power bit sequences such that the higher power bit sequences will be transmitted with lower probability than would their corresponding data bits in an equal probability encoding scheme.

Figure 5:
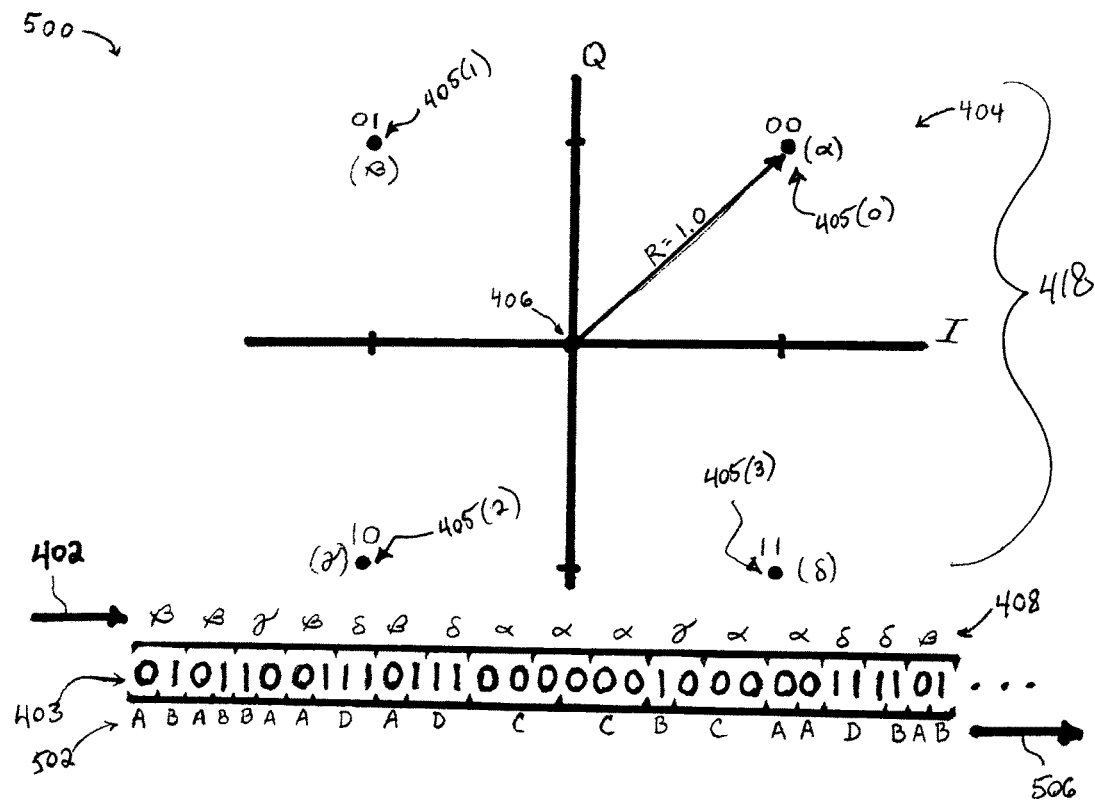
FIG. 5 is a schematic illustration depicting an exemplary symbol transmission process, according to an alternative embodiment.

FIG. 5 is a schematic illustration depicting an alternative symbol transmission process 500. In an exemplary embodiment, process 500 utilizes the same input binary string 403 as process 400 for outgoing symbol transmission, as well as the comparison with symbol stream 402 to demonstrate reduction in transmission power. In this example, the comparison reference of encoding scheme 418 utilizes the same two-bit groups of 1s and 0s arranged in 4-state QPSK constellation diagram 404 about origin 406, and each state 405 occupies a Q-I point on constellation diagram 404 at an equal radial distance (e.g., R=1.0) from origin 406. Each state 405 again represents 2 bits, with each state having an approximately equal occurrence probability of 0.25, and an approximately equal transmit current and transmit power, on average over time, as well as an energy efficiency of 0.5 J per bit. Entropy, H, for this system is 1.811 bits per symbol (0.125*3)+(0.125*3)+(0.375*1.415)+(0.375*1.415).

Process 500 monitors incoming symbol stream 402 and assigns a plurality of symbols 502 of a different, lower probability encoding scheme 504 as compared with the equal probability encoding scheme 418, discussed above. In an example of this alternative embodiment, the plurality of converted symbols 502 includes four distinct symbols (denoted A, B, C, and D in FIG. 5). That is, in comparison with the QPSK-encoded equal-probability data symbol stream 402, an outgoing data symbol stream 506 is transmitted that also has four states, but of unequal probabilities. Outgoing data symbol stream 506 assigns symbols 502 such that lower power bit sequences will occur with higher relative probability than higher power bit occurrences, similar to process 400 (FIG. 4).

In an exemplary embodiment, outgoing symbol stream 506 of encoding scheme 504 is depicted in a 4-level amplitude shift keying (ASK) table 508 utilizing four symbols 502 (A, B, C, and D). In operation, table 508 can be a lookup table in a processor (see FIG. 6, below) for assigning symbols to received binary string 403, or may be a conversion process (e.g., from a higher power symbol scheme to a lower power symbol scheme) similar to that described above with respect to process 400 (FIG. 4).

In the example illustrated in FIG. 5, the 4-level ASK encoding scheme 504 designates a signal amplitude of 0 volts (V) as corresponding to no data being transmitted (or just above the base operating threshold, described above). In comparison to, or conversion from, symbol stream 402, when a single 0 is encountered by process 500, symbol A (single-bit sequence of 0) is transmitted in outgoing symbol stream 506 with an amplitude of 1 V. Similarly, when a single 1 is encountered, symbol B (single-bit sequence of 1) is transmitted in outgoing symbol stream 506 with an amplitude of −1 V. When a bit sequence of 000 is encountered, symbol C is transmitted in outgoing symbol stream 506 with amplitude of 3 V. Similarly, encountering a bit sequence of 111 may prompt process 500 to transmit symbol D in outgoing symbol stream 506 with an amplitude of −3 V.

As illustrated in table 508, single-bit sequences 0 and 1 from binary string 403 have the highest probability of occurring (p=0.375 each), and bit sequences 000 and 111 have a lower probability of occurring (p=0.125 each). In an exemplary embodiment, for incoming binary string 403, a monitoring system (e.g., system 600, FIG. 6, below) can be programmed such that bit sequences 000 and 111 take precedence over single-bit occurrences of 0 and 1 for assignment of outgoing symbols 502 by process 500 because the 3-bit sequences (symbols C and D) have lower probabilities of occurrence within binary string 403 and require greater energy and higher transmit power and current relative to the 1-bit occurrences (symbols A and B).

In an exemplary embodiment, implementation of process 500 allows for a significant reduction in average transmitted energy, current, and power through use of the 4-level ASK unequal probability encoding scheme 504 on outgoing symbol stream 512, as compared with the 4-state equal probability encoding scheme 418. For an incoming binary string (e.g., string 403) of arbitrary length, the probability of occurrence of each individual QPSK symbol 408 ($\alpha$, $\beta$, $\gamma$, and $\delta$) is the same, namely p=0.5. In contrast, converted symbols 502 (A, B, C, D) do not have equal probabilities of occurrence. Again, on average, the probabilities of encountering the 3-bit groups of 000 (symbol C) and 111 (symbol D) are each approximately 0.125, while the probabilities of encountering the single-bit occurrences of 0 or 1 are each approximately 0.375. As in the examples described above, power is proportional to voltage squared, and a resistance of 1 ohm is assumed to simplify calculations. Using these average probabilities, and assuming 1 W of power is used to transmit each symbol in both 4-state QPSK encoding and 4-level ASK encoding (again, using the same simplified assumptions described above), a significant reduction in transmit energy, current, and power is obtained by reducing p of outgoing symbol stream 506.

For comparison purposes, further advantages of encoding scheme 504 can be understood with reference to analogous states under a conventional ASK encoding scheme. For example, in the conventional equal probability scheme, the A symbol would be assigned to the bit sequence "01" (+1 V), the B symbol would be assigned to the bit sequence "10" (−1 V), the C symbol would be assigned to the bit sequence "00" (+3 V), and the D symbol would be assigned to the bit sequence "11" (−3 V). This conventional scheme, all four bit sequences will have an equal occurrence probability, that is ¼ each, or p=0.25, and Shannon entropy is 2.

For this 4-level ASK equal probability example, assuming a load resistance of 1 ohm, the probability of a C or a D is 0.25 with a power of 9 (3 volts squared) and the probability of an A or a B is 0.25 with a power of 1 (1 volt squared). Given these equal occurrence probabilities, an average power of 5 watts will be used for transmission.

In contrast, for the 4-level ASK unequal probability example, the probability of a "1" or "0" is 0.375 with a power of 1 watt, and the probability of a "000" or "111" is 0.125 with a power of 9 watts. Given these unequal occurrence probabilities for the four available symbols 502, an average power of 3 watts will be used for transmission, which is approximately a 40 percent power reduction, and a significant improvement over conventional transmission techniques.

Similar to process 400, described above with respect to FIG. 4, process 500 utilizes 20 symbols for the unequal probability ASK encoding scheme 504, whereas 16 symbols are used in the 4-state QPSK encoding scheme 418 to transmit the same information. Accordingly, for applications where there may be limitations on transmission power, but where excess bandwidth (or transmission time) is available, alternative process 500 facilitates is also particularly advantageous in such instances. That is, due to the unequal probabilities per symbol in encoding scheme 504, an encoding by process 500 may transmit fewer bits per symbol, but at a significantly reduced power.

Nevertheless, assignment of, or conversion from, symbol encoding schemes according to the present embodiments further result in a better power-over-time system, such that the required battery life to upload a large amount of data is also enhanced. Analogizing the 4-level ASK encoding scheme 504, along with table 508, to a constellation diagram, process 500 further illustrates the principles of the present application where center states (e.g., constellation diagram points closest to the origin) are populated with a higher probability symbols than outer states. Process 500 utilizes the advantageous properties of outgoing symbol stream 506 by assigning less probable bit sequences (e.g., 000 and 111) to symbols 502 having higher transmit power (e.g., symbols C and D), and by assigning more probable bit sequences (e.g., 0 and 1) to symbols 502 having lower transmit power (e.g., symbols A and B).

Furthermore, in the embodiments represented by FIG. 5, a person of ordinary skill in the art would recognize and appreciate that process 500 is not limited for use with the equal symbol probability 4-state/4-symbol QPSK scheme examples discussed herein, and that process 500 more broadly represents the conversion from (or comparison with) an incoming data stream encoded with a higher order encoding scheme, having either equal or unequal symbol occurrence probabilities, in order to output a lower power probability encoding scheme.

Figure 6:
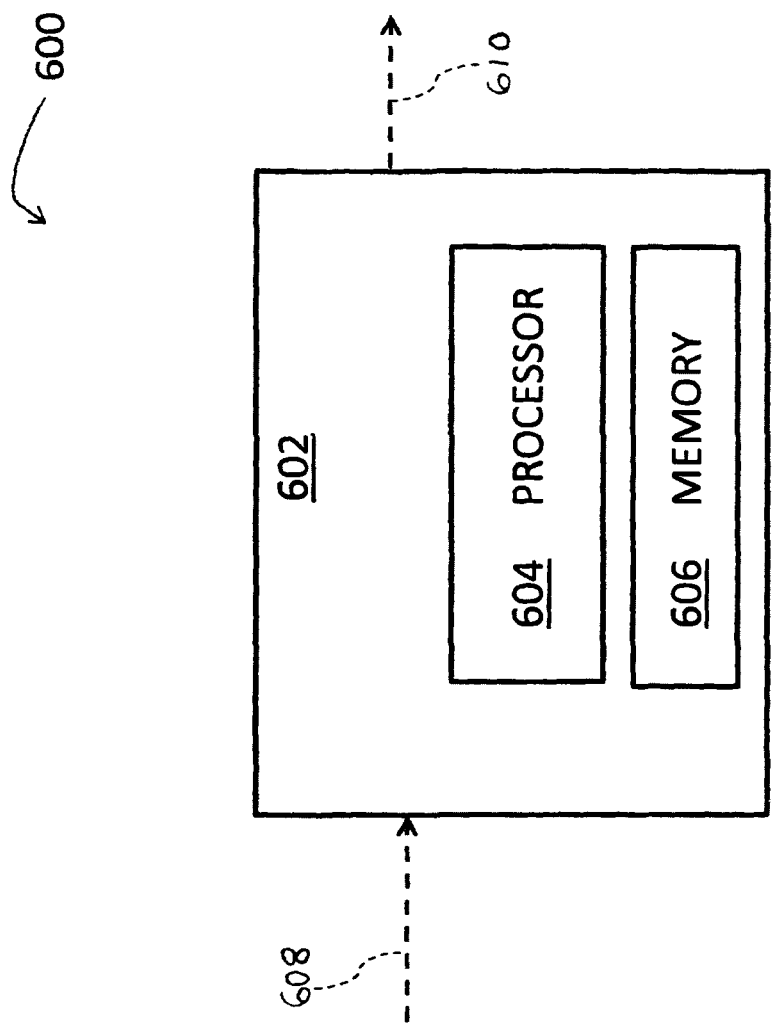
FIG. 6 is a schematic illustration of an exemplary symbol transmission system, according to an embodiment.

FIG. 6 is a schematic illustration of an exemplary data distribution system 600 in accordance with an exemplary embodiment of the present disclosure. In the exemplary embodiment, data distribution system 600 is embodied within a fiber-optic communication system. Alternatively, data distribution system 600 is embodied within, or in communication with, one or more of a wireline communication system, a wireless communication system, and a communication system including a combination of different data transmission mediums (e.g., wireless, optical, wired). One having ordinary skill in the art would recognize and appreciate that data distribution system 600 and associated methods and processes shown and described herein are readily applicable to symbol assignment, conversion, transmission in general, and/or to data distribution systems other than fiber-optic communication systems.

Data distribution system 600 includes a symbol transmission unit 602. Symbol transmission unit 602 includes a processor 604 and a memory 606. Symbol transmission unit 602 receives an incoming data stream (e.g., binary string 403, FIG. 4) as an incoming data stream 608 from at least one upstream data source (not shown), and transmits an outgoing symbol stream 610 to at least one downstream receiver (not shown). After being received by symbol transmission unit 602, incoming data stream 608 undergoes at least one data processing step prior to being transmitted as outgoing symbol stream 610. In the exemplary embodiment, the at least one data processing step is performed by symbol transmission unit 602 using suitable digital and/or analog electronic components, including in conjunction with processor 604 and memory 606.

Also, in the exemplary embodiment, the at least one data processing step includes symbol transmission process 400 and/or symbol transmission process 500. In operation, in the exemplary embodiment, incoming data stream 608 includes a binary data stream of arbitrary length. Alternatively, incoming data stream 608 includes a plurality of incoming symbols, where each incoming symbol encodes at least two bits. In cases where incoming data stream 608 is encoded by the plurality of incoming symbols (e.g., of equal probability) prior to receipt by symbol transmission unit 602, the plurality of incoming symbols can be converted into outgoing symbol stream 610 including a plurality of outgoing symbols of differing probabilities. For example, and without limitation, with incoming data stream 608 encoded using the 4-state QPSK scheme (shown and described above with reference to FIGS. 4 and 5), symbol transmission unit 602 may implement process 400 to convert incoming symbols included with data stream 608 into outgoing symbol stream 610 of differently-encoded symbols per length of the binary data string (e.g., the binary equivalent representation of the incoming symbol stream). In an exemplary embodiment, the number of differently-encoded symbols in outgoing symbol stream 610 is greater than the number unconverted signals from incoming data stream 608.

In operation, processor 604 is configured to monitor incoming data stream 608 to determine an order of incoming binary bits of data and bit sequences. In an exemplary embodiment, processor 604 is further configured to determine the prevalence, order, and sequence of bits encoded by the incoming symbols. Referring back to FIGS. 4 and 5, for example, processor 604 may be configured to monitor incoming data stream 608 for purposes of facilitating real-time symbol assignment by symbol transmission unit 602. In an exemplary embodiment, a predefined assignment and/or conversion program is stored as software in memory 606 and is implemented by processor 604 for determining which bits and bit sequences are assigned, or which incoming symbols are to be converted, into a plurality of outgoing symbols. Optionally, memory 606 may additionally store a lookup table (e.g., table 508, FIG. 5) as a portion of the predefined assignment (and/or conversion) program, or as a separate database.

In an alternative embodiment, more than one predefined assignment and/or conversion programs are stored as software in memory 606 to enable symbol transmission unit 602 to assign a plurality of probability-based symbol streams 610 using at least one of process 400 and process 500. In a further alternative embodiment, processor 604 may selectively assign or convert only a portion of the symbols from incoming data stream 608 into a probability-based symbol stream, and pass through other data according to conventional encoding schemes, or in the case of a received pre-encoded symbol stream, pass through some of the pre-encoded symbols unconverted. In the alternative embodiment, system 600 is configured to adapt to a lower probability symbol encoding scheme where battery power is limited, and to an equal probability encoding scheme where transmit time is limited.

In an alternative embodiment, symbol transmission unit 602 implements (e.g., using at least one of processor 604 and memory 606) an inverse operation of process 400 and/or process 500 to convert a plurality of incoming symbols of an incoming symbol stream to a plurality of outgoing symbols of an outgoing symbol stream. For example, and without limitation, symbol transmission unit 602 is able to convert incoming symbol stream having, on average, lower power incoming symbols to outgoing symbol stream having, on average, higher power outgoing symbols. Such an inverse conversion scheme may be implemented, for example, in instances where a portion of a fiber-optic network (or drop cable) may encounter more limited bandwidth considerations in relation to electromagnetic energy considerations.

The embodiments described herein significantly improve the accuracy of determining the maximum data capacity of available communication lines in light of the available transmit power. These embodiments further facilitate mitigation of the effects of signal attenuation, combined noise, and limited transmit power on data throughput for both upstream and downstream signals. The present embodiments also allow for determining more efficient data transmission techniques to utilize to maximize data throughput in a channel where the signal to noise ratio varies with frequency.

Through monitoring incoming signals containing data encoded by a scheme considering a first set of equally probable symbols, and assigning a second set of symbols having unequal occurrence probabilities in comparison with, or by conversion from, the first set of symbols, the above-described systems and methods provide a scalable solution for reducing the average transmit power requirement for incoming data streams. By manipulating the Shannon-Hartley Theorem, for example, to make certain symbols having reduced transmit power requirements more probable relative to other symbols in an encoded data transmission, the above-described signal power reduction systems and methods implement a symbol assignment process to increase the power efficiency of the transmission. Moreover, by reducing the occurrence of particular symbols having higher transmit power relative to other symbols, the systems and methods described herein provide enhanced resilience of transmitted data signals to noise and other impairments, and the ability of data transmission systems to dynamically adapt to changing conditions.

More generally, with respect to higher order encoding schemes, including, without limitation, 16-QAM (shown and described above in FIG. 1) and greater, for data transmission where transmission energy and/or power are limited, but excess bandwidth is available, transmitting more probable, lower power symbols than lower probability, higher power symbols can be considered to be a more efficient use of limited electromagnetic energy. Where there is excess bandwidth present, but limited electromagnetic energy and/or electrical power available for transmitting data using that bandwidth, analogous considerations apply to the inside of a drop cable as to the inside of a fiber optic cable, and the question is not how much data can you send, but how many bits are conveyed (without error) per joule (J) of energy.

Referring back to Table 1, in an example of a full-duplex network, when 2 transmitters both transmit within the same frame, but in opposite directions, 15 times out of 16 the transmission pulses will be received in different time slots.

In the 16th instance, however, when the time slots match, both respective receivers can determine (from a missing "X") that the same timeslot was chosen by the respective transmitters at the other end. According to this example, a similar reduced power transmission system can effectively transmit a desired bit sequence by manipulating the transmission timing according to similar probability principles to recover excess power transmitted with the time penalty of conventional systems. That is, according to this embodiment, the transmission timing can be adjusted such that the average transmission power is closer to $\frac{1}{16}$ W, or 0.0625 W, for 4 bits of information, as opposed to the 0.5 W average transmission power that would be utilized by a conventional system for the same 4 bits. In an exemplary embodiment, a field programmable gate array (FPGA) or an integrated circuit (IC) is implemented to execute these principles instead of a high speed stream processor.

An exemplary technical effect of the signal power reduction systems and methods described herein includes at least one of: (a) providing for accurately determining the maximum data capacity of communications lines based on the available transmit power; (b) facilitate mitigating effects of attenuation and combined noise, along with limited transmit power, on data throughput for both upstream and downstream signals; (c) enabling determining the most power efficient data transmission technique to utilize to maximize data throughput in a wide channel where the signal to noise varies with frequency; (d) providing a scalable solution for reducing the average transmit power requirement for incoming symbol streams encoded using 4-state and higher encoding schemes; (e) making certain symbols having reduced transmit power requirements more probable relative to other symbols in an encoded data transmission, thereby increasing the power efficiency of the transmission; (f) enhancing resilience of transmitted data signals to noise and other impairments; and (g) enabling data transmission systems to dynamically adapt to changing conditions.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of reducing transmission power for an encoded data stream comprising the steps of:
   receiving an incoming data stream having a first average transmit power for a plurality of incoming data bits;
   assigning a symbol scheme to the received data bits of the incoming data stream according to probabilities of occurrence of individual ones of the received data bits; and
   transmitting an outgoing data stream according to the assigned symbol scheme having a second average transmit power, different than the first average transmit power, for a plurality of outgoing symbols,
   wherein each outgoing symbol of the plurality of outgoing symbols has N possible states, and
   wherein a probability of occurrence for a first portion of the plurality of outgoing symbols is greater than 1/N, and a probability of occurrence for a second portion of the plurality of outgoing symbols is less than 1/N.

2. The method of claim 1 further comprising, in the step of assigning, determining the probabilities of occurrence of a sequence of the individual ones of the received data bits.

3. The method of claim 2, wherein in the step of assigning, higher power symbols are determined to be less probable than lower power symbols.

4. The method of claim 1, wherein:
   the step of receiving comprises receiving the incoming data stream at a first bandwidth; and
   the step of transmitting comprises transmitting the outgoing data stream at a second bandwidth greater than the first bandwidth.

5. The method of claim 1, wherein the assigned symbol scheme is a lesser state scheme relative to a symbol scheme having equal probability states.

6. The method of claim 5, wherein the assigned symbol scheme is a 3-state scheme.

7. The method of claim 5, wherein the assigned symbol scheme represents a one-dimensional constellation diagram, and the symbol scheme having equal probability states represents a two-dimensional constellation diagram.

8. The method of claim 1, wherein the assigned symbol scheme is an ASK symbol scheme.

9. The method of claim 1, wherein a ratio of the second average transmit power to the first average transmit power is 3:5 or lower.

10. The method of claim 9, wherein the ratio of the second average transmit power to the first average transmit power is 1:2 or lower.

11. The method of claim 1, wherein the step of receiving comprises receiving the incoming data stream encoded using an encoding scheme including at least one of quadrature amplitude modulation (QAM), quadrature phase shift keying (QPSK), amplitude shift keying (ASK), and binary amplitude shift keying (BASK).

12. The method of claim 1, wherein the first portion of the plurality of outgoing symbols are transmitted at lower power than the second portion of the plurality of outgoing symbols.

13. The method of claim 1, wherein the assigned symbol scheme implements a non-uniform number of bits per symbol.

14. The method of claim 13, wherein the incoming data stream includes an incoming symbol scheme implementing a uniform number of bits per symbol.

15. The method of claim 1, wherein the assigned symbol scheme implements a non-integer number of bits per symbol.

16. The method of claim 15, wherein the non-integer number of bits per symbol is 1.5.

17. The method of claim 15, wherein the non-integer number of bits per symbol is 1.811.

18. A symbol transmission system for encoding a data stream comprising: a memory; and
a processor communicatively coupled with the memory, said processor programmed to execute instructions to:
receive an incoming data stream of binary data bits;
determine a probability of occurrence of the binary data bits;
assign a symbol scheme to the incoming data stream based on the determined probability, wherein the assigned symbol scheme includes a first plurality of symbols having a lower probability than the determined probability and a second plurality of symbols having a greater probability than the determined probability; and
transmit an outgoing data stream according to the assigned symbol scheme.

19. The system of claim 18, wherein the memory includes at least one lookup table.

20. The system of claim 18, wherein the assigned symbol scheme includes a non-integer entropy value for a number of bits assigned to one or more symbols.

* * * * *